United States Patent
Hsu et al.

(10) Patent No.: US 11,153,921 B2
(45) Date of Patent: Oct. 19, 2021

(54) METHOD AND APPARATUS FOR LINK ENABLEMENT AND DISABLEMENT DURING MULTI-LINK OPERATION IN A WIRELESS NETWORK

(71) Applicant: MEDIATEK INC., Hsinchu (TW)

(72) Inventors: Chien-Fang Hsu, Hsinchu (TW); Yongho Seok, San Jose, CA (US); James Chih-Shi Yee, San Jose, CA (US)

(73) Assignee: MEDIATEK INC.

( * ) Notice: Subject to any disclaimer, the term of this patent is extended or adjusted under 35 U.S.C. 154(b) by 0 days.

(21) Appl. No.: 16/685,917

(22) Filed: Nov. 15, 2019

(65) Prior Publication Data

US 2020/0163141 A1    May 21, 2020

Related U.S. Application Data

(60) Provisional application No. 62/769,023, filed on Nov. 19, 2018.

(51) Int. Cl.
| | |
|---|---|
| *H04W 4/00* | (2018.01) |
| *H04W 76/15* | (2018.01) |
| *H04W 28/10* | (2009.01) |
| *H04W 52/02* | (2009.01) |
| *H04W 88/06* | (2009.01) |

(52) U.S. Cl.
CPC .......... *H04W 76/15* (2018.02); *H04W 28/10* (2013.01); *H04W 52/0203* (2013.01); *H04W 88/06* (2013.01)

(58) Field of Classification Search
CPC ..... H04W 76/15; H04W 88/06; H04W 28/10; H04W 52/0203
USPC ................. 370/328, 394, 318, 338
See application file for complete search history.

(56) References Cited

U.S. PATENT DOCUMENTS

| | | | |
|---|---|---|---|
| 9,544,782 B2 * | 1/2017 | Vardhan | H04W 28/02 |
| 10,270,517 B2 * | 4/2019 | Van Oost | H04W 52/0206 |
| 2007/0008889 A1 * | 1/2007 | Seo | H04W 16/26 370/232 |
| 2014/0066117 A1 * | 3/2014 | Egner | H04L 67/306 455/513 |
| 2015/0318945 A1 * | 11/2015 | Abdelmonem | H04L 5/0023 370/329 |
| 2016/0359572 A1 * | 12/2016 | Zhou | H04W 74/0816 |
| 2017/0366249 A1 * | 12/2017 | Van Oost | H04W 24/02 |
| 2018/0092039 A1 | 3/2018 | Cariou et al. | |
| 2018/0206174 A1 | 7/2018 | Zhou et al. | |
| 2018/0206274 A1 * | 7/2018 | Cherian | H04L 25/0226 |

(Continued)

*Primary Examiner* — Marceau Milord

(57) ABSTRACT

Embodiments of the present invention provide a method and apparatus for simultaneous transmission and reception of data wirelessly using different wireless bands. The multi-link operations described herein can provide higher network throughput and improved network flexibility compared to traditional techniques to wireless communication. Link management operations such as enabling and disabling of a link may be performed by an AP or STA by sending a frame over a link that is currently active. Moreover, an AP may request a switch to a different link available on the AP side for MLO, for example, when a link is occupied by interference and is not available when AP needs to use the link, and the operating parameters of a target link can be updated.

28 Claims, 12 Drawing Sheets

(56) References Cited

U.S. PATENT DOCUMENTS

2018/0294903 A1* 10/2018 Goodman ............. H04W 16/32
2019/0082394 A1*  3/2019 Abdelmonem ....... H04L 5/0023
2019/0335454 A1  10/2019 Huang et al.
2019/0342065 A1* 11/2019 Padaki .................. H04L 1/0013
2020/0205230 A1*  6/2020 Haustein ............... H04W 88/06

* cited by examiner

METHOD AND APPARATUS FOR LINK ENABLEMENT AND DISABLEMENT DURING MULTI-LINK OPERATION IN A WIRELESS NETWORK

CROSS-REFERENCE TO RELATED APPLICATIONS

This application claims the benefit of and priority to provisional patent application Ser. No. 62/769,023, with filing date Nov. 19, 2018, which is hereby incorporated by reference in its entirety.

FIELD

Embodiments of the present invention generally relate to the field of wireless communications. More specifically, embodiments of the present invention relate to systems and methods for managing the operation of wireless devices for multi-link communication over a wireless network.

BACKGROUND

Modern electronic devices typically send and receive data with other electronic devices wirelessly using Wi-Fi, and many of these devices are "dual band" devices that include at least two wireless transceivers capable of operating in different frequency bands e.g., 2.4 GHz and 5 GHz. In most cases, a wireless device will communicate over only a single band at a time. For example, older and low-power devices e.g., battery powered devices, often operate on the 2.4 GHz band. Newer devices and devices that require greater bandwidth often operate on the 5 GHz band.

However, in some cases, the use of a single band may not satisfy the bandwidth needs of certain devices. Therefore, some developing approaches to wireless communication increase communication bandwidth by operating on multiple bands concurrently, and can control which wireless device or devices can use the multiple bands, for example, based on current network traffic. This approach may be referred to as Multi-link Operation (MLO). What is needed is an approach to MLO for wireless networks that can selectively enable and disable links, for example, to reduce power consumption when there is no urgent data to exchange or the amount of traffic in the network is little, or to improve peak throughput and connection stability between wireless devices.

SUMMARY

Accordingly, embodiments of the present invention provide a method and apparatus for simultaneous transmission and reception of data wirelessly using different wireless bands. The multi-link operations described herein can provide higher network throughput and improved network flexibility compared to traditional techniques to wireless communication. Link management operations such as enabling and disabling of a link may be performed by an AP or STA by sending a frame over a link that is currently active. Moreover, an AP may request a switch to a different link available on the AP side for MLO, for example, when a link is occupied by interference and is not available when AP needs to use the link, and the operating parameters of a target link can be updated.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
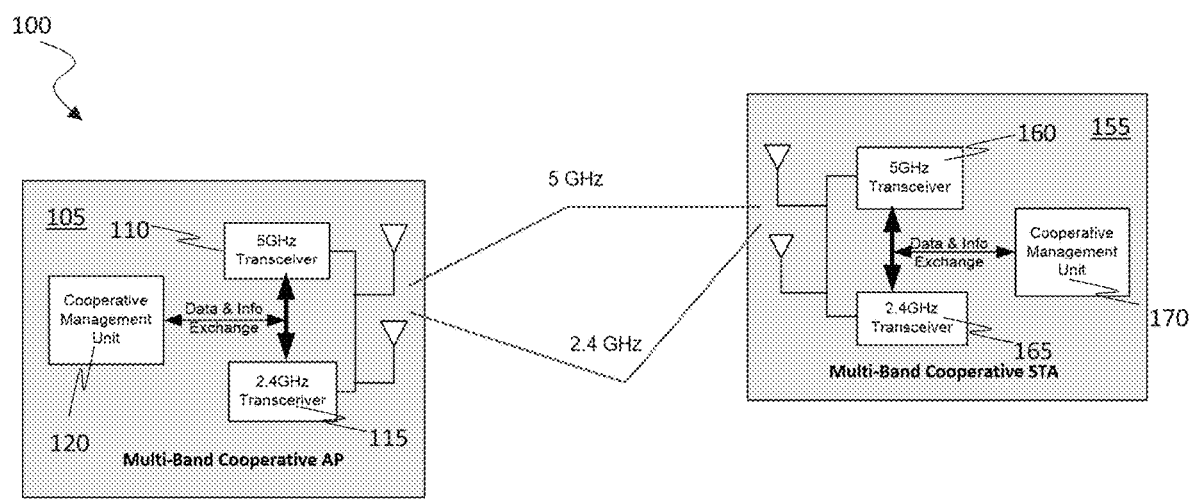
FIG. 1 is a block diagram of an exemplary wireless communication system or network including a multi-band cooperative AP and a multi-band cooperative STA depicted according to embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIGS. 8, 9, and 10) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "associating," "identifying," "encoding," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Method and Apparatus for Link Enablement and Disablement During Multi-Link Operation in a Wireless Network As used herein, the term "EHT" may refer to a recent generation of wireless communication (Wi-Fi) known as Extremely High Throughput (EHT) and is defined according to the IEEE 802.11be standards. The term station (STA) may refer to an electronic device capable of sending and receiving data over Wi-Fi that is not operating as an access point (AP).

Embodiments of the present invention provide a method and apparatus for simultaneous transmission and reception of data wirelessly using different wireless bands. The multi-link operations described herein can provide higher network throughput and improved network flexibility compared to traditional techniques to wireless communication. Link management operations such as enabling and disabling of a link may be performed by an AP or STA by sending a frame over a link that is currently active. Moreover, an AP may request a switch to a different link available on the AP side for MLO, for example, when a link is occupied by interference and is not available when AP needs to use the link, and the operating parameters of a target link can be updated.

According to embodiments of the present invention, when a link is enabled, both the AP and STA are aware of the link's enabled status. The link can be active, in a power-save mode, or following target wake time (TWT) operations for a doze/service period. An enabled link can be disabled through a frame exchange initiated by the AP or STA over an enabled link. When a link is disabled, the AP and STA both are aware of the link's disabled status. In this case, the AP shall not send frames to the STA in the link and the STA shall not send frames to AP in the link. A disabled link can be enabled through a frame exchange initiated by the AP or STA over an enabled link.

In general, according to embodiments of the present invention, N links operate over different RF bands. Links can be selectively enabled or disabled via a frame exchange over an active link. The frame exchange for enabling a link can include operation parameters for configuring the link. An STA's power save operations, such as TWT, for a specific link can be negotiated through a frame exchange over an enabled link. Moreover, a link can be switched to a different RF band via the frame exchange over the enabled link.

The specific capabilities and operational parameters of each link are negotiated during association, and the parameters can be updated through a frame exchange when the link is enabled. For example, when an STA associates with an AP, the capabilities and operational parameters of each link are negotiated and are configured accordingly after successful association. The capabilities may include, for example, RF bands (2.4G, 5G, 6G), Number of Spatial Streams (NSS), bandwidth (e.g., 20 MHz, 40 MHz, etc.), and a station type (EHT, HE, VHT, or HT STA). The operational parameters can include, for example, Link ID, primary band and operation BW of the link, a required delay from disabled status to enabled status, and a required delay for switching channels.

With regard to FIG. 1, an exemplary wireless communication system 100 including a multi-band cooperative AP 105 and a multi-band cooperative STA 155 is depicted according to embodiments of the present invention. The multi-band cooperative AP 105 includes a 5 GHz transceiver 110 and a 2.4 GHz transceiver 115. Other types of transceivers that operate on different bands, such as 6 GHz and above, can also be used by the multi-band cooperative AP 105 according to embodiments of the present invention. The transceivers 110 and 115 of AP 105 exchange data and information with cooperative management unit 120 that coordinates information sent and/or received by transceivers 110 and 115.

The multi-band cooperative ST 155 includes a 5 GHz transceiver 160 and a 2.4 GHz transceiver 165. Other types of transceivers that operate on different bands, such as 6 GHz and above, can also be used by the multi-band cooperative STA 155 according to some embodiments of the present invention. The transceivers 160 and 165 of STA 155 exchange data and information with cooperative management unit 170 that coordinates information sent and received by transceivers 160 and 165 using 5 GHz band wireless communication and 2.4 GHz band wireless communication, respectively.

The multi-band cooperative AP 105 and the multi-band cooperative STA 155 have simultaneous transmission and reception capability for communicating using different wireless bands. The transmitters operating on the different bands can perform independent clear channel assessments (CCAs) using joint or intendent transmissions. Moreover, full duplex communication can be enabled by independent multi-band operation using FDD mode.

The STA 155 can access channels in multiple bands independently. For example, after receiving an enhanced distributed channel access (EDCA) transmission opportunity (TXOP) frame, the STA 155 can begin transmitting frames over the respective band during the window of time provided in the EDCA TXOP frame. When the STA 155 receives EDCA TXOP frames in multiple bands simultaneously, the STA 155 can transmit frames using multiple bands simultaneously during the provided window of time.

The STA 155 transmitting frames using multiple bands simultaneously can mitigate delay and improve peak throughput of the STA 155. However, in some cases, transmitting frames using multiple bands simultaneously can degrade the performance of the basic service set (BSS) comprising the STA 155. For example, the performance of the BSS can be degraded when the STA 155 operating on multiple bands simultaneously uses a substantial amount of the bandwidth available to the BSS due to the increased traffic. Therefore, the AP 105 can control which STAs are granted multi-band channel access, and the access can be terminated by the AP at any time, for example, based on changing network conditions or requirements, or to conserve power when the amount of traffic to be transmitted is relatively low. In other words, depending on certain conditions, such as traffic load, a non-AP STA may use fewer than all supported/available links in order to reduce energy consumption.

According to some embodiments of the present invention, an AP and an associated STA are both aware of the availability of every link. The AP can send a request to the STA to enable links that are currently disabled. The STA can agree to enable the link or links, partially agree, or disagree with the request. The AP can send a request to STA to disable links if the AP will no longer use the links for downstream traffic. The STA can agree to disable the link or links, partially agree, or disagree with the request. The STA can enable disabled links and sends a notice to the AP indicating that the links have been enabled. The STA can also disable enabled links send a notice to the AP indicating that the links have been disabled. The frame exchange 200 for enabling or disabling a link or links is transmitted over a currently enabled link associated with the AP and the STA.

Figure 2A:
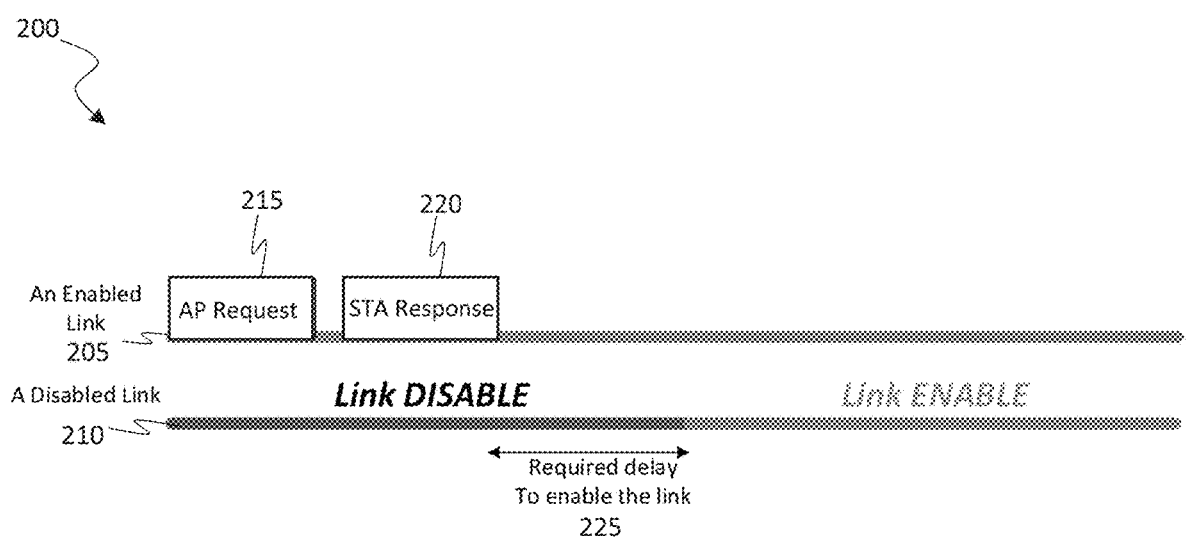
FIG. 2A depicts an exemplary frame exchange initiated by an AP for enabling a disabled link according to embodiments of the present invention.

FIG. 2A depicts an exemplary frame exchange timing diagram 200 initiated by an AP for enabling a disabled link 210 according to embodiments of the present invention. The frame exchange 200 includes a request 215 to enable the disabled link 210 carried over an enabled link 205. The enabled link 205 and the disabled link 210 transmit over different bands (e.g., 2.4 GHz, 5 GHz, 6 GHz, etc.) Specifically, the AP sends request frame 215 carrying link IDs and an ENABLE flags to the STA to enable one or more disabled links. The frame can also carry operational parameter update information for the links. In response to the request frame 215, the STA can follow AP's request to enable some or all of the identified links. In this case, the STA determines operational parameter updates for the link or links to be enabled (if any). The STA sends a response frame 220 to the AP to indicate which link or links will be enabled (if any), and for each link, the frame can include a new delay defining the required delay 225 for enabling a respective link.

As indicated above, for each link that is to be enabled, the STA shall enable the link after a certain delay. An initial delay for the link may be negotiated between the AP and the STA and defined in the operating parameters of the link. If the response frame 220 does not carry delay information for the link, the AP and the STA can use the link after the negotiated delay of the operational parameters. If the response frame 220 indicates a new delay for the link, the AP and the STA can use the link after the new delay indicated in the response frame 220.

Otherwise, if the STA does not agree to enable the identified link or links, the STA sends response frame 220 to the AP indicating that the AP's request has been denied. In either case, the frame exchange described above is implemented via an enabled link, and the AP and the STA update the status (enabled/disabled) of the links accordingly.

Still with regard to FIG. 2A, the exemplary frame exchange 200 can be initiated by an AP to disable one or more enabled links according to embodiments of the present invention. In this case, the request frame 215 transmitted by the AP includes link IDs and DISABLE flags for requesting disablement of an enabled link or links. The STA can agree to disable all or some of the identified links, and the STA sends a response frame 220 carrying link IDs of the links to be disabled to the AP. Accordingly, the AP stops transmitting to the STA over the links indicated in the response frame 220, and the STA stops transmitting to the AP over the links indicated in the response frame 220 after sending the response frame 220 to AP. If the STA disagrees to disable the links identified in the request frame 215, the STA sends a response frame 220 to the AP denying the request. In this case, the STA and the AP can continue transmitting over the identified links.

The information of the frame exchange timing diagram 200 described above for disabling a link or links is transmitted over an enabled link. The AP and the STA update the status (enabled/disabled) of each link accordingly. Link enablement and disablement initiated by an AP can be implemented in the same request frame (e.g., request frame 215) and the response frame (e.g., response frame 220) can also agree/disagree with both the enablement request and the disablement request at the same time.

Figure 2B:
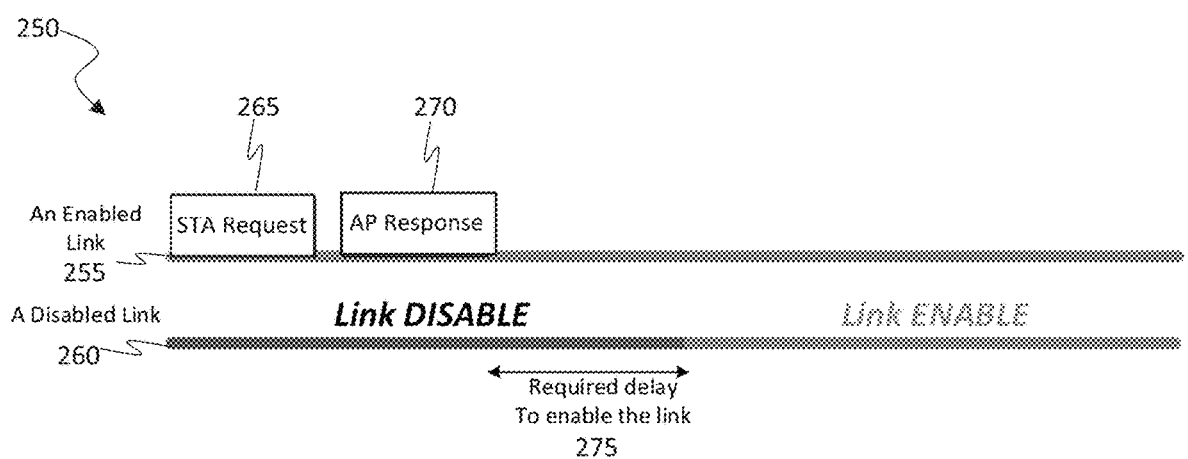
FIG. 2B depicts an exemplary frame exchange initiated by an STA for enabling a disabled link according to embodiments of the present invention.

Link enablement and/or disablement frame exchange can also be initiated by an STA associated with an AP. FIG. 2B depicts an exemplary frame exchange timing diagram timing diagram 250 initiated by an STA for enabling a disabled link 260 according to embodiments of the present invention. For instance, the STA sends a request frame 265 carrying link IDs and ENABLE flags to the AP to request enablement of a disabled link or links (e.g., disabled link 260). The request frame 265 may also carry operational parameter update information of each link. The AP sends a response frame 270 to the STA to confirm which requested links will be enabled. After receiving the response frame 270, for each link to be enabled, the STA enables the link using the updated operational parameters carried in the request frame 265, if any. The AP updates the operational parameters of the link and after a delay 275, AP and STA can transmit over the enabled link. The delay 275 can be the delay initially negotiated between the AP and the STA, or a new delay identified in the updated operational parameters carried in the request frame 265. The frame exchange 250 described above is transmitted over an enabled link 255 associated with the AP and the STA.

Still with regard to FIG. 2B, the exemplary frame exchange 250 can also be used by the STA to initiate disablement of an enabled link or links according to embodiments of the present invention. The STA sends a request frame 265 carrying link IDs and DISABLE flags to the AP to request disablement of an enabled link or links. The AP sends a response frame to the STA to confirm which links will be disabled (if any), and for each link to be disabled, the AP stops transmitting to the STA over the respective link after sending the response frame 270 to the STA. The STA stops transmitting to the AP over the disabled link or links after receiving the response frame 270 from the AP. The above frame exchange 250 is transmitted over the enabled link 255. Link enablement and disablement initiated by an STA can be implemented using a single request frame (e.g., request frame 265), and the response frame (e.g., response frame 270) can confirm both the enablement request and the disablement request at the same time.

Figure 3:
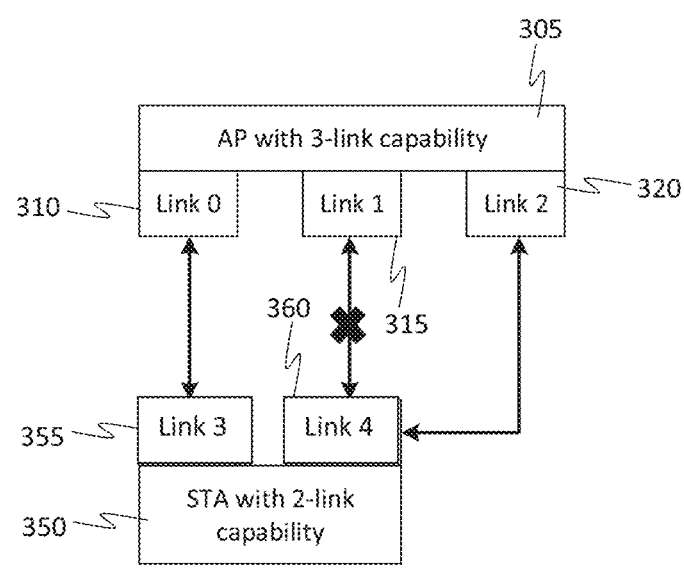
FIG. 3 depicts an exemplary link switch operation between an AP and an STA for MLO according to embodiments of the present invention.

FIG. 3 is a block diagram that depicts an exemplary link switch operation between an AP 305 and an STA 350 for MLO according to embodiments of the present invention. As depicted in FIG. 3, the AP 305 can communicate wirelessly over 3 wireless links (Link 0 (310), Link 1 (315), and Link 2 (320)), and the STA 350 can communicate wirelessly over 2 wireless links (Link 3 (355) and Link 4 (360)). When a link, e.g., between the AP's Link 1 (315) and the STA's Link 4 (360), is occupied by interference or is otherwise unavailable when an AP needs to use the link, the AP can request to switch to another link that is available on the AP side and then begin MLO. For example, as depicted in FIG. 3, the AP can request to switch to a link between the AP's Link 2 (320) and the STA's Link 4 (360).

Figure 4:
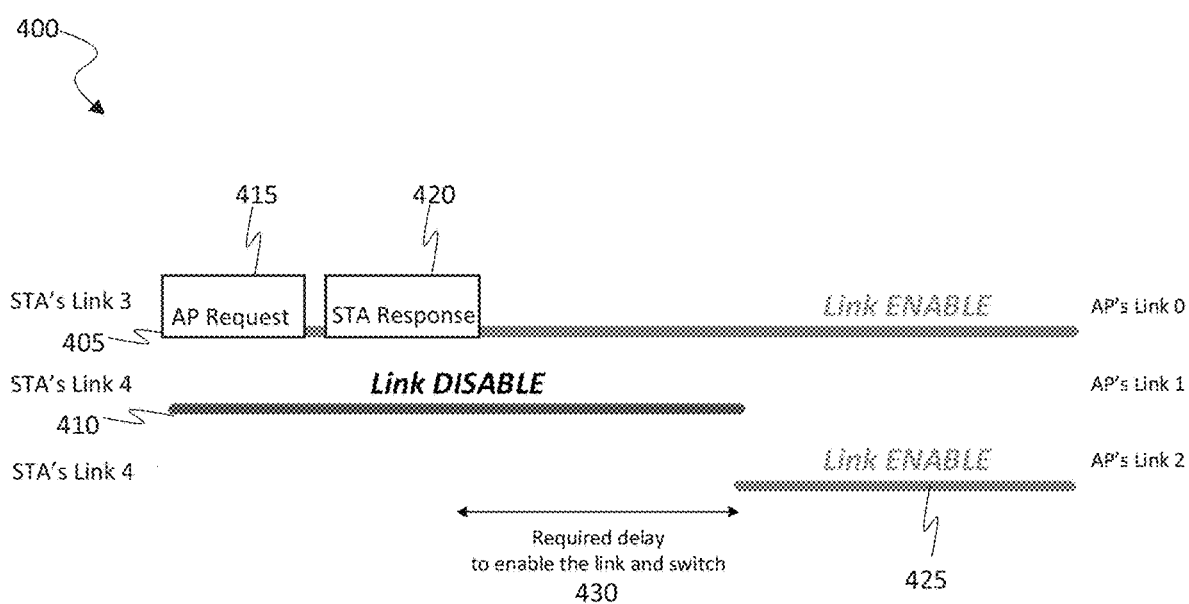
FIG. 4 depicts an exemplary timing diagram of a frame exchange initiated by an AP for enabling a link and switching to the link according to embodiments of the present invention.

As depicted in the timing diagram of FIG. 4, according to embodiments of the present invention, the AP transmits a request frame 415 that carries the link ID and an enable FLAG as well as information regarding the target link 425 to switch to, such as the link ID and Operation BW of the target link to perform link switching frame exchange 400. The STA can agree or disagree with the request. If the STA agrees it sends a response frame 420 to the AP carrying a required delay 430 of the link switch and switches from the specified link 410 to the target link 425 identified in the request frame 415. Enabled link 410 is disabled and the identified link 425 is enabled after a delay 430. If the STA disagrees, it sends a response frame denying the AP's request, and the STA waits for another request from the AP. In this case, the identified link remains disabled. The frame exchange 400 is transmitted over an enabled link (e.g., link 405).

Figure 5:
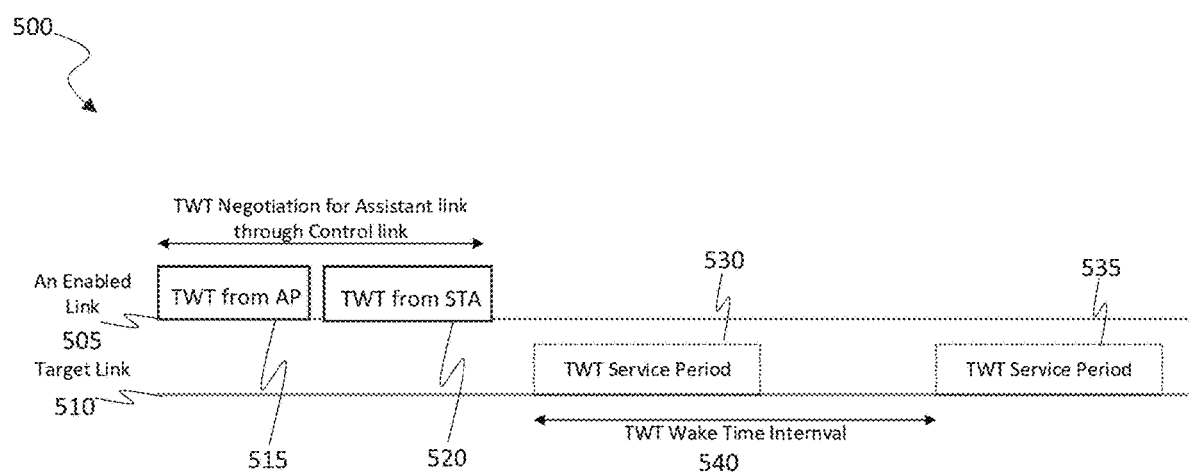
FIG. 5 depicts a timing diagram of an exemplary link TWT element frame exchange for configuring the TWT operation of a target link using an enabled link according to embodiments of the present invention.

With regard to the timing diagram of FIG. 5, an exemplary link TWT element frame exchange 500 for configuring the TWT operation of a target link 510 using an enabled link 505 is depicted according to embodiments of the present invention. TWT negotiation is performed between the AP and the STA. Specifically, a TWT Element 515 including the target link ID is transmitted from the AP to the STA, and the STA transmits a TWT Element 520 confirming or denying the AP's request. If the negotiation is successful, the TWT element for the target link is updated to include the link ID of target link 510. The target link then operates using the updated TWT. For example, as depicted in FIG. 5, the TWT Wake time interval 540 for the target link 510 defines active and inactive period for the target link 510. Specifically, the target link 510 is active during TWT Service Periods 530 and 535, and the target link 510 is inactive outside of the TWT Service Periods 530 and 535.

According to some embodiments of the present invention, the TWT element carries operation parameters for multiple links, including the link that carries the frame exchange including the TWT element.

According to embodiments of the present invention, an STA in non-AP Multi-Link Logical Entity (MLLE) capable of multi-link operation negotiates TWT parameters with the AP in AP MLLE for the current link and for other link at the same time. An STA in non-AP MLLE can negotiate TWT parameters for other links at the same time via a single TWT negotiation. It is assumed that the APs can maintain timing synchronization across the links.

According to some embodiments of the present invention, all enable, disable, link switch, and power save mode setup frame exchanges may be transmitted over a dedicated control link that always remains enabled. Other available links are used as assistant links that can be dynamically enabled and disabled. The control link traffic is not limited to frames of link enable, disable, link switch, and power save mode setup. In other words, regular data traffic can also be transmitted over the control link.

Figure 6:
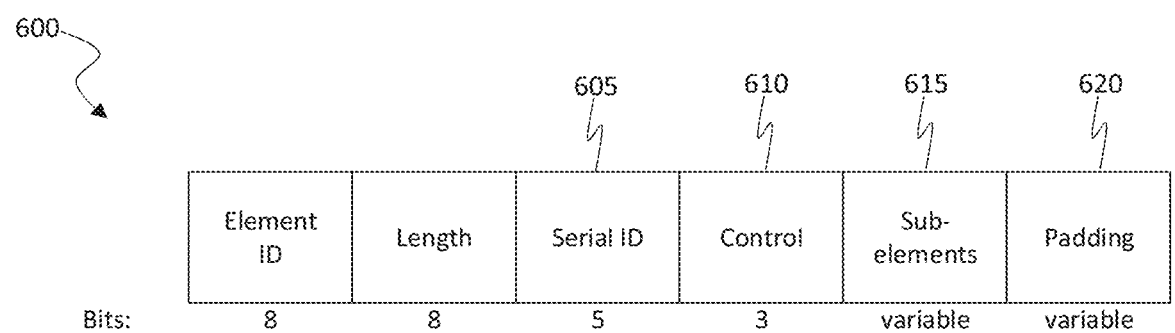
FIG. 6 depicts an exemplary element for providing response or request information for selectively enabling and disabling links according to embodiments of the present invention.

FIG. 6 depicts an exemplary data format element 600 for providing response or request information for selectively enabling and disabling links according to embodiments of the present invention. Serial ID field 605 has a length of 5 bits and indicates the ID of the request as assigned by the requester. The response frame transmitted in response to the request includes the same ID in Serial ID field 605. Control field 610 has a length of 3 bits and indicates if the element 600 is:

A Request;

A response with rejection that rejects all link enable/disable requests in the corresponding request frame;

A response with acceptance that accepts all link enable/disable requests in the corresponding request frame; or A response with partial acceptance accepting some requests in the corresponding request frame.

Figure 7:
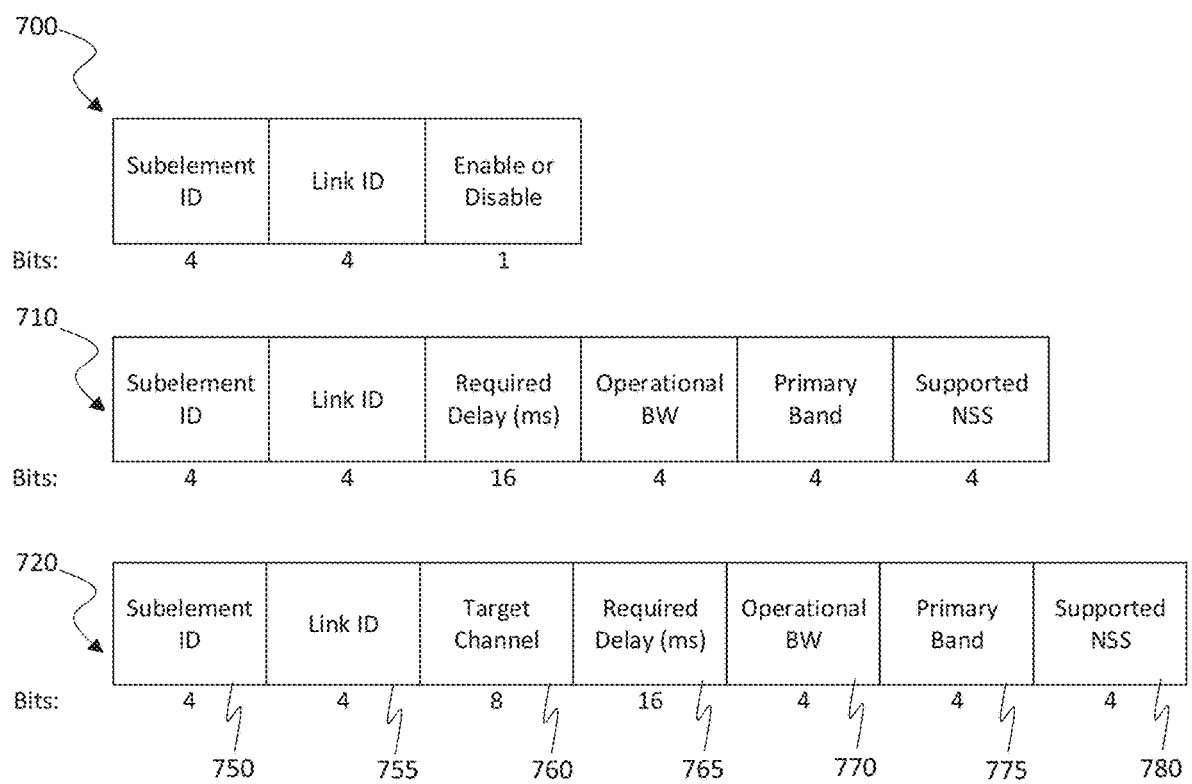
FIG. 7 depicts exemplary sub-element fields of an element to provide information for selectively enabling and disabling links and optionally configuring operational parameters of a link according to embodiments of the present invention.

Sub-elements field 615 has a variable length and provides detailed request/response information such as link ID, etc. Examples of sub-elements field 615 are depicted in FIG. 7 according to embodiments of the present invention. Padding field 620 includes a variable number of bits set to zero for aligning the element length of element 600 with an integer of octets.

With regard to Sub-elements fields 700, 710, and 720 of FIG. 7, each include a sub-element ID field 750 having a length of 4 bits that indicates the type/function of the sub-element. For example, data format sub-element field 700 enables/disables a target link, sub-element field 710 enables/disables a target link and updates operating parameters of the target link, and sub-element field 720 switches a target link to a target channel and updates operating parameters of the target link.

The link ID field 755 has a length of 4 and indicates the target link for enabling, disabling, and/or configuring the operating parameters of the target link. The target channel field 760 has a length of 8 bits and indicates the target channel for performing a channel switch for the target link. Required delay field 765 has a length of 16 bits and indicates the delay required before enabling the target link. Operational BW field 770 has a length of 4 bits and indicates the operating bandwidths of the target link. Primary band field 775 has a length of 4 bits and indicates the primary operating band of the target link. Supported NSS field 780 has a length of 4 bits and indicates the number of spatial streams supported by the target link.

Figure 8:
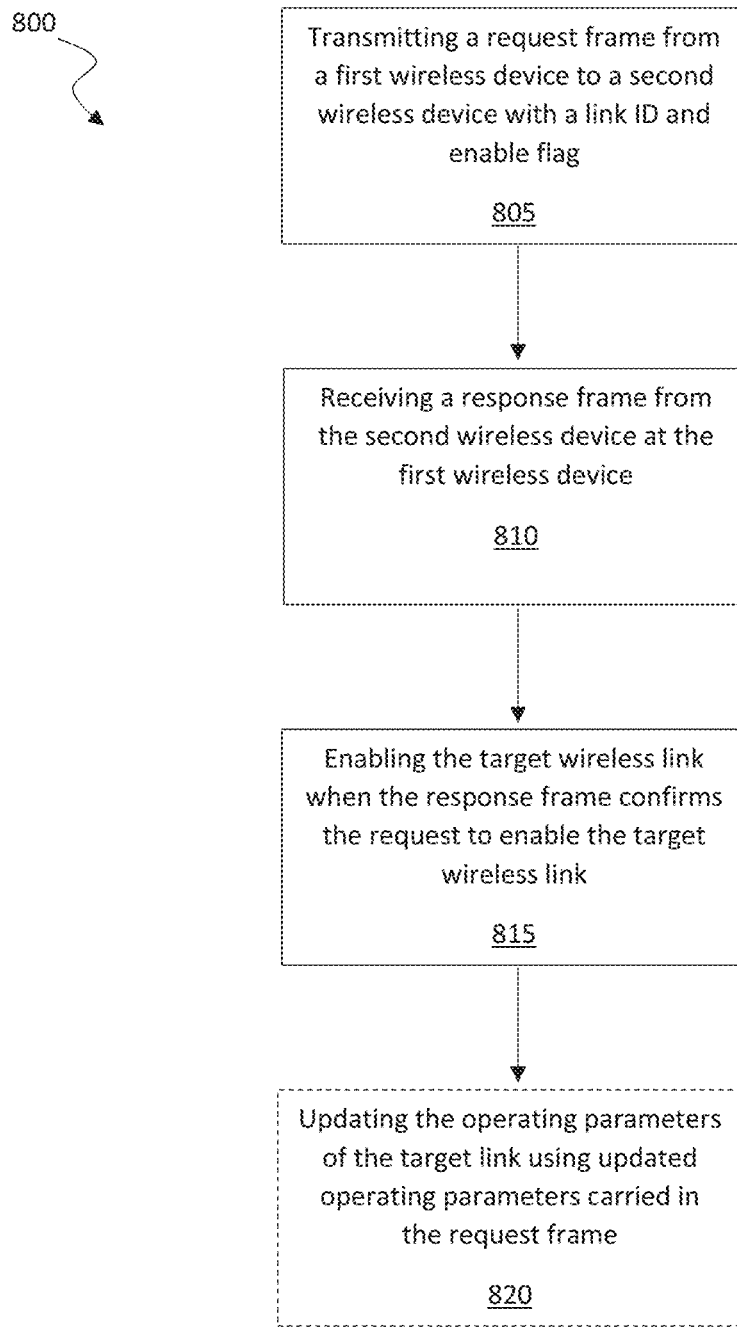
FIG. 8 is a flow chart depicting an exemplary sequence of computer implemented steps for selectively enabling a wireless link according to embodiments of the present invention.

With regard to FIG. 8, a flow chart of an exemplary sequence of computer implemented steps of a process 800 for selectively enabling a wireless link is depicted according to embodiments of the present invention.

At step 805, a request frame is transmitted from a first wireless device to a second wireless device with a link ID and enable flag indicating a request to enable the target wireless link.

At step 810, a response frame is received from the second wireless device at the first wireless device.

At step 815, the target wireless link is enabled when the response frame confirms the request to enable the target wireless link.

Optionally, at step 820, the operating parameters of the target link are updated using updated operating parameters carried in the request frame.

Figure 9:
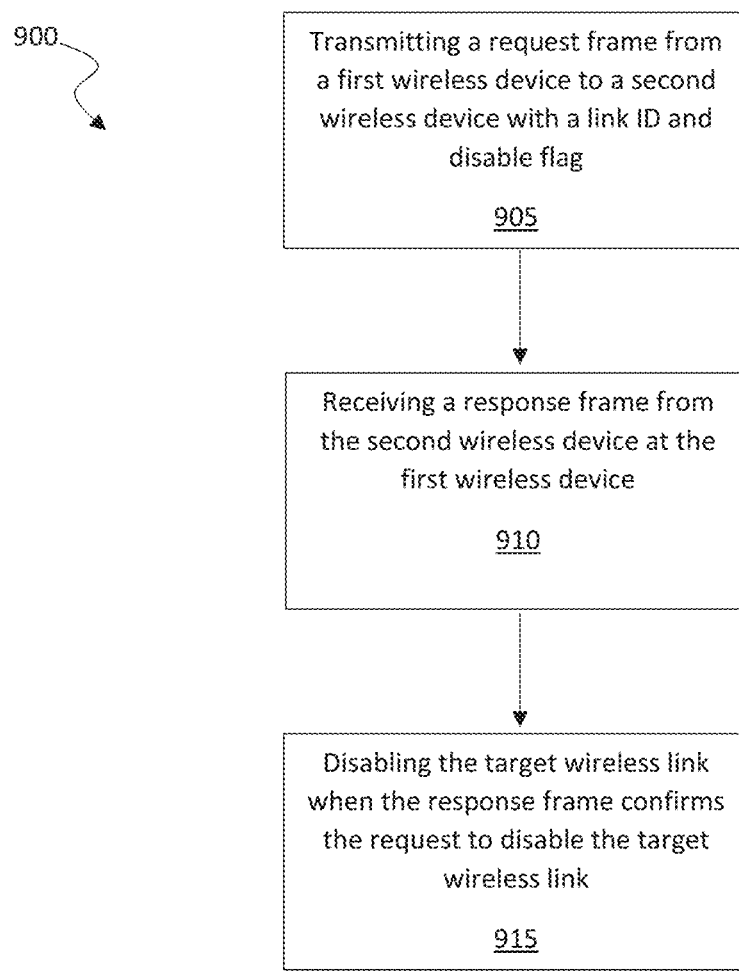
FIG. 9 is a flow chart depicting an exemplary sequence of computer implemented steps for selectively disabling a wireless link according to embodiments of the present invention.

With regard to FIG. 9, a flow chart depicting an exemplary sequence of computer implemented steps of a process 900 for selectively disabling a wireless link is depicted according to embodiments of the present invention.

At step 905, a request frame is transmitted from a first wireless device to a second wireless device with a link ID and disable flag indicating a request to disable the target wireless link.

At step 910, a response frame is received from the second wireless device at the first wireless device.

At step 915, the target wireless link is disabled when the response frame confirms the request to disable the target wireless link.

Figure 10:
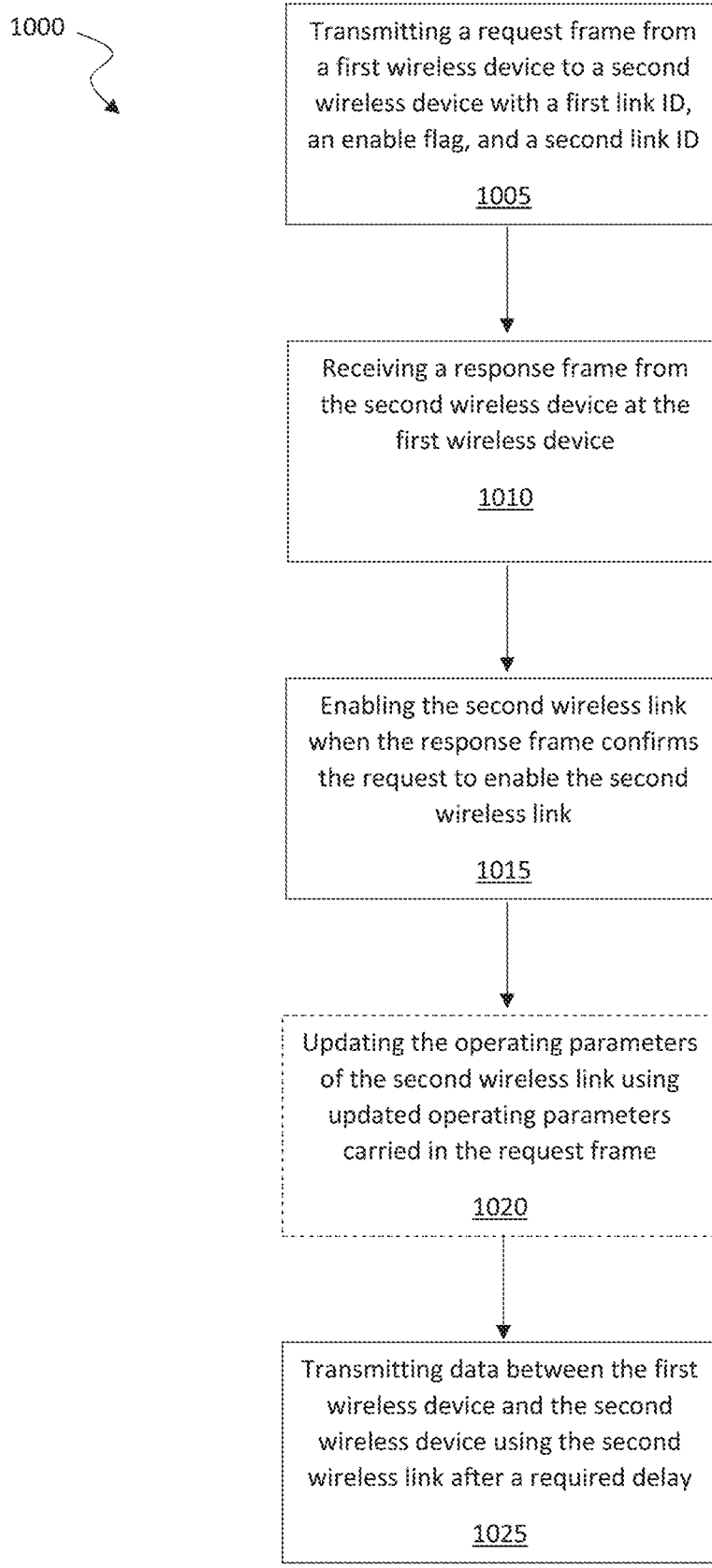
FIG. 10 is a flow chart depicting an exemplary sequence of computer implemented steps for selectively enabling a wireless link and switching to the link according to embodiments of the present invention.

With regard to FIG. 10, a flow chart of an exemplary sequence of computer implemented steps of a process 1000 for switching from a first wireless link to a second wireless link for performing MLO between a first wireless device and a second wireless device are shown according to embodiments of the present invention.

At step 1005, a request frame is transmitted from a first wireless device to a second wireless device with a first link ID, a second link ID, and an enable flag indicating a request to enable the second wireless link.

At step 1010, a response frame is received from the second wireless device at the first wireless device.

At step 1015, the second wireless link is enabled when the response frame confirms the request to enable the second wireless link.

Optionally, at step 1020, the operating parameters of the second wireless link are updated using updated operating parameters carried in the request frame.

At step 1025, data is transmitted between the first wireless device and the second wireless device using the second wireless link for MLO after a required delay.

Exemplary Computer Controlled System

Embodiments of the present invention are drawn to electronic systems for performing power management for cooperative multi-band operations in a wireless network. The following discussion describes one such exemplary electronic system or computer system can be used as a platform for implementing embodiments of the present invention.

Figure 11:
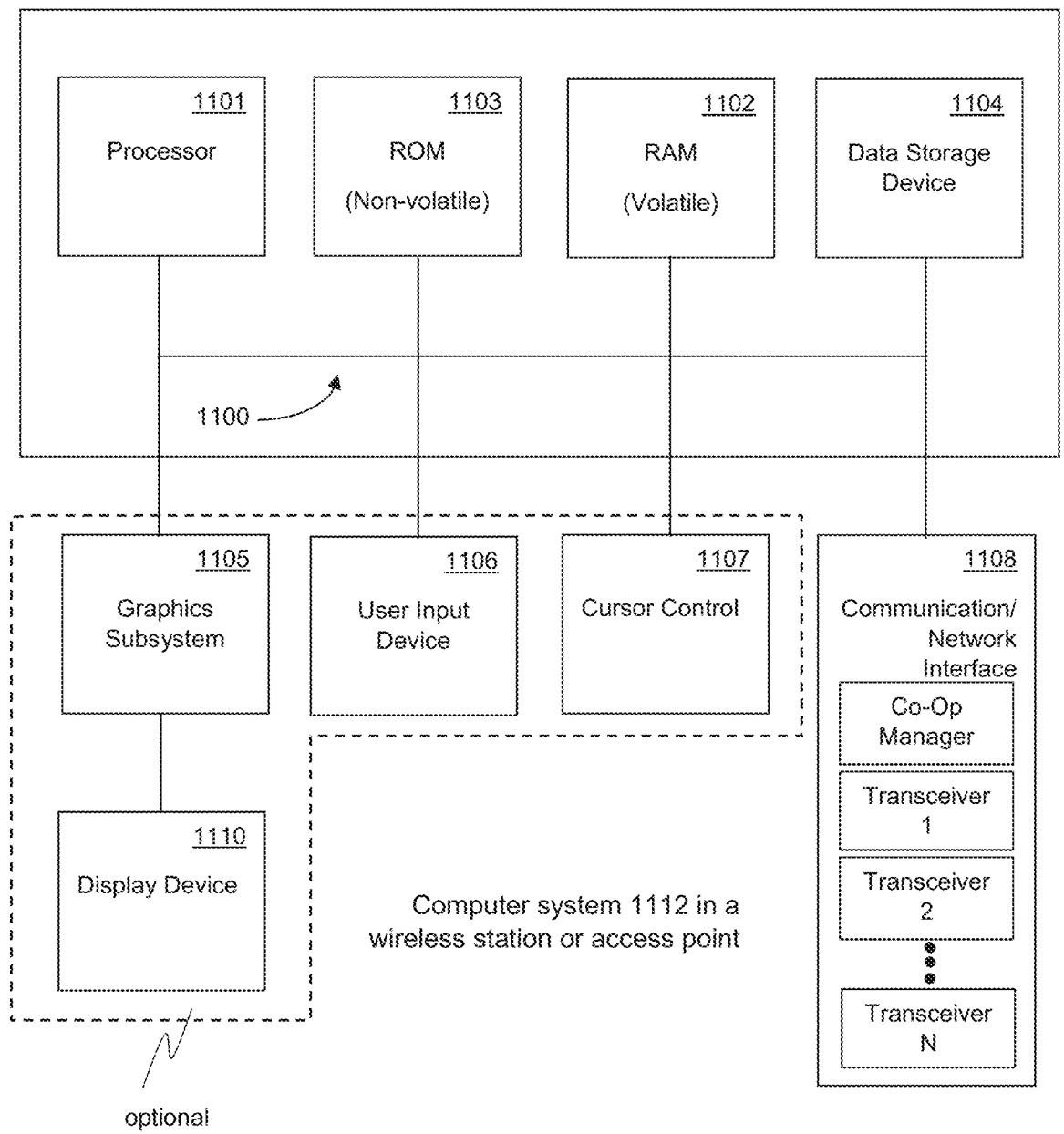
FIG. 11 is a block diagram of an exemplary computer system platform upon which embodiments of the present invention may be implemented.

In the example of FIG. 11, the exemplary computer system 1112 (e.g., a multi-band cooperative wireless access point AP or a multi-band cooperative wireless station STA) includes a central processing unit (CPU) 1101 for running software applications and optionally an operating system. Random access memory 1102 and read-only memory 1103 store applications and data for use by the CPU 1101. Data storage device 1104 provides non-volatile storage for applications and data and may include fixed disk drives, removable disk drives, flash memory devices, and CD-ROM, DVD-ROM or other optical storage devices. The optional user inputs 1106 and 1107 comprise devices that communicate inputs from one or more users to the computer system 1112 (e.g., mice, joysticks, cameras, touch screens, and/or microphones).

A communication or network interface 1108 includes a plurality of transceivers and allows the computer system 1112 to communicate with other computer systems, networks, or devices via an electronic communications network, including wired and/or wireless communication and including an Intranet or the Internet (e.g., 802.11 wireless standard). The communication or network interface 1108 can operate multiple transceivers simultaneously e.g., Transceiver 1 and Transceiver 2. The communication or network interface 1108 can further include a cooperative management unit for coordinating the data sent and/or received by the transceivers. The communication or network interface 1108 and can include a dual band interface that can operate in multiple bands simultaneously, such as 2.4 GHz, 5 GHz, and/or 6 GHz. Link management operations are performed by an AP or non-AP STA to control the status (e.g., active or doze) of specific links/bands, for example, to conserve power or increase peak throughput between devices.

The optional display device 1110 may be any device capable of displaying visual information in response to a signal from the computer system 1112 and may include a flat panel touch sensitive display, for example. The components of the computer system 1112, including the CPU 1101, memory 1102/1103, data storage 1104, user input devices 1106, and graphics subsystem 1105 may be coupled via one or more data buses 1100.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Embodiments of the present invention are thus described. While the present invention has been described in particular embodiments, it should be appreciated that the present invention should not be construed as limited by such embodiments, but rather construed according to the following claims.

What is claimed is:

1. A method of selectively enabling a target wireless link operable to provide communication between a first wireless device and a second wireless device during multi-link operation (MLO), the method comprising:
   transmitting a request frame from the first wireless device to the second wireless device, the request frame comprising a link ID of the target wireless link and a request to enable the target wireless link;
   receiving a response frame from the second wireless device at the first wireless device;
   enabling the target wireless link by using the first wireless device when the response frame confirms the request to enable the target wireless link; and
   the first wireless device performing a multi-link operation with the second wireless device using the target wireless link.

2. The method of claim 1, wherein the first wireless device comprises a wireless access point (AP) and the second wireless device comprises a wireless station (STA).

3. The method of claim 2, wherein the request frame comprises link IDs of a plurality of target wireless links, and wherein the response frame indicates link IDs of a subset of the plurality of target wireless links that will be enabled.

4. The method of claim 2, wherein the response frame denies the request to enable the target wireless link.

5. The method of claim 1, wherein the request frame comprises updated operating parameters for the target link and further comprising updating the operating parameters of the target link using the updated operating parameters.

6. The method of claim 1, wherein the request frame and the response frame are both transmitted over a currently enabled link.

7. The method of claim 6, wherein the currently enabled link comprises a dedicated control link that remains enabled.

8. The method of claim 1, wherein the first wireless device comprises a wireless station (STA) and the second wireless device comprises a wireless access point (AP).

9. A method of selectively disabling a target wireless link between a first wireless device and a second wireless device during multi-link operation (MLO), the method comprising:
   transmitting a request frame from the first wireless device to the second wireless device over a first wireless link, the request frame comprising a link ID of the target wireless link and a request to disable the target wireless link;
   receiving a response frame from the second wireless device at the first wireless device over the first wireless link;
   disabling the target wireless link by using the first wireless device when the response frame confirms the request to disable the target wireless link; and
   the first wireless device performing a multi-link operation using the first wireless link when the target wireless link is disabled.

10. The method of claim 9, wherein the first wireless device comprises a wireless access point (AP) and the second wireless device comprises a wireless station (STA).

11. The method of claim 10, wherein the request frame comprises link IDs of a plurality of target wireless links, and wherein the response frame indicates link IDs of a subset of the plurality of target wireless links that will be disabled.

12. The method of claim 9, wherein the response frame denies the request to disable the target wireless link.

13. The method of claim 9, wherein the disabling the target wireless link comprises ceasing transmission over the target wireless link after receiving the response frame.

14. The method of claim 9, wherein the request frame and the response frame are transmitted over a currently enabled link.

15. The method of claim 14, wherein the currently enabled link comprises a dedicated control link that remains enabled.

16. A method of setting up a target wake time (TWT) operation for a target wireless link between a first wireless device and a second wireless device during multi-link operation (MLO), the method comprising:
   transmitting a request frame from the first wireless device to the second wireless device, the request frame comprising a TWT element and a link ID of the target wireless link for initiating a TWT negotiation;
   receiving a response frame from the second wireless device at the first wireless device for completing the TWT negotiation;
   configuring the target wireless link by using the first wireless device based on the TWT negotiation; and
   the first wireless device performing a multi-link operation with the second wireless device using the target wireless link.

17. The method of claim 16, wherein the TWT negotiation comprises performing TWT negotiation for multiple links at the same time.

18. The method of claim 16, wherein the target wireless link comprises the wireless link that carries the request frame and the response frame.

19. The method of claim 16, wherein the TWT element comprises operational parameters for the target link and further comprising updating the TWT element to include the link ID of the target link.

20. The method of claim 16, wherein the first wireless device comprises a wireless access point (AP) and the second wireless device comprises a wireless station (STA).

21. An apparatus for selectively enabling a target wireless link to perform a multi-link operation over a wireless network, the apparatus comprising:
   a transceiver configured to send and receive data over the wireless network; and
   a processor operable to:
      cause the transceiver to transmit a request frame to a wireless device over the wireless network, the request frame comprising a link ID of the target wireless link and a request to enable the target wireless link;
      receive a response frame from the wireless device using the transceiver;
      enable the target wireless link when the response frame confirms the request to enable the target wireless link; and
      cause the transceiver to perform a multi-link operation using the target wireless link.

22. The apparatus of claim 21, wherein the wireless device comprises a wireless station (STA).

23. The apparatus of claim 22, wherein the request frame comprises link IDs of a plurality of target wireless links, and wherein the response frame indicates link IDs of a subset of the plurality of target wireless links that will be enabled.

24. The apparatus of claim 22, wherein the response frame denies the request to enable the target wireless link.

25. The apparatus of claim 21, wherein the request frame comprises updated operating parameters for the target link, and wherein the processor is further operable to update the operating parameters of the target link using the updated operating parameters.

26. The apparatus of claim 21, wherein the request frame and the response frame are both transmitted over a currently enabled link.

27. The apparatus of claim 26, wherein the currently enabled link comprises a dedicated control link that remains enabled.

28. The apparatus of claim 21, wherein the wireless device comprises a wireless access point (AP).

* * * * *